(12) United States Patent
Chambon

(10) Patent No.: US 12,205,445 B2
(45) Date of Patent: Jan. 21, 2025

(54) DEVICE FOR MONITORING A MOTOR VEHICLE, IN PARTICULAR A MOTORCYCLE, KIT AND METHOD BASED ON SAID DEVICE

(71) Applicant: KIBLE, Toulouse (FR)

(72) Inventor: Thomas Chambon, Toulouse (FR)

(73) Assignee: KIBLE, Toulouse (FR)

( * ) Notice: Subject to any disclaimer, the term of this patent is extended or adjusted under 35 U.S.C. 154(b) by 0 days.

(21) Appl. No.: 17/907,621

(22) PCT Filed: Apr. 2, 2021

(86) PCT No.: PCT/EP2021/058819
§ 371 (c)(1),
(2) Date: Sep. 28, 2022

(87) PCT Pub. No.: WO2021/198522
PCT Pub. Date: Oct. 7, 2021

(65) Prior Publication Data
US 2023/0196890 A1  Jun. 22, 2023

(30) Foreign Application Priority Data
Apr. 3, 2020  (FR) ...................................... 2003350

(51) Int. Cl.
*G08B 13/14* (2006.01)
*H04M 1/72* (2021.01)
(Continued)

(52) U.S. Cl.
CPC .......... *G08B 13/1436* (2013.01); *H04M 1/72* (2013.01); *H04W 4/02* (2013.01);
(Continued)

(58) Field of Classification Search
CPC ......... H04M 1/72463; H04M 1/72454; H04M 1/725; H04M 1/60; H04W 4/00;
(Continued)

(56) References Cited

U.S. PATENT DOCUMENTS

2003/0023361 A1\* 1/2003 Umeda ................. B60R 21/268
701/45
2014/0195125 A1\* 7/2014 Siegel ................... H04W 4/029
701/1
(Continued)

FOREIGN PATENT DOCUMENTS

GB        2388231 A      11/2003

OTHER PUBLICATIONS

NPL Search (Jun. 12, 2023).\*

*Primary Examiner* — Van T Trieu
(74) *Attorney, Agent, or Firm* — Leason Ellis LLP

(57) ABSTRACT

The invention relates to a device for monitoring a motor vehicle, in particular a motorcycle (2), configured to be connected to an interface (3) of the motor vehicle (2), the device comprising: —a processor (1a) associated with a memory (1b), —a geolocation module (1c), —a vibration detection module (1d) and/or a fall detection module (1f), —a mobile application module (1g) for exchanging information on the vehicle with a mobile application server (4), —a silent alert module (1i) via the mobile application server (4) according to vibration detection module data (1d) or fall detection module data (1f), characterized by: —a mobile internet network connection module (1i), —an audible alarm (5), and in that the mobile application module (1g) is configured to remotely control the audible alarm (5).

7 Claims, 1 Drawing Sheet

(51) Int. Cl.
*H04W 4/02* (2018.01)
*B60R 25/10* (2013.01)
*B60R 25/33* (2013.01)
*G08B 21/02* (2006.01)

(52) U.S. Cl.
CPC ....... *B60R 2025/1013* (2013.01); *B60R 25/33* (2013.01); *B60R 2325/106* (2013.01); *B60R 2325/205* (2013.01); *B60R 2325/306* (2013.01); *G08B 13/1427* (2013.01); *G08B 21/0269* (2013.01)

(58) Field of Classification Search
CPC ......... H04W 4/02; H04W 4/021; H04W 4/04; H04W 4/06; H04W 4/14; H04N 17/00; H04N 17/002; G08G 1/00; G08G 1/01
See application file for complete search history.

(56) References Cited

U.S. PATENT DOCUMENTS

2016/0216130 A1\* 7/2016 Abramson ......... G01C 21/3423
2020/0023920 A1 1/2020 Simon
2021/0234955 A1\* 7/2021 Mahar ................... H04W 4/021

\* cited by examiner

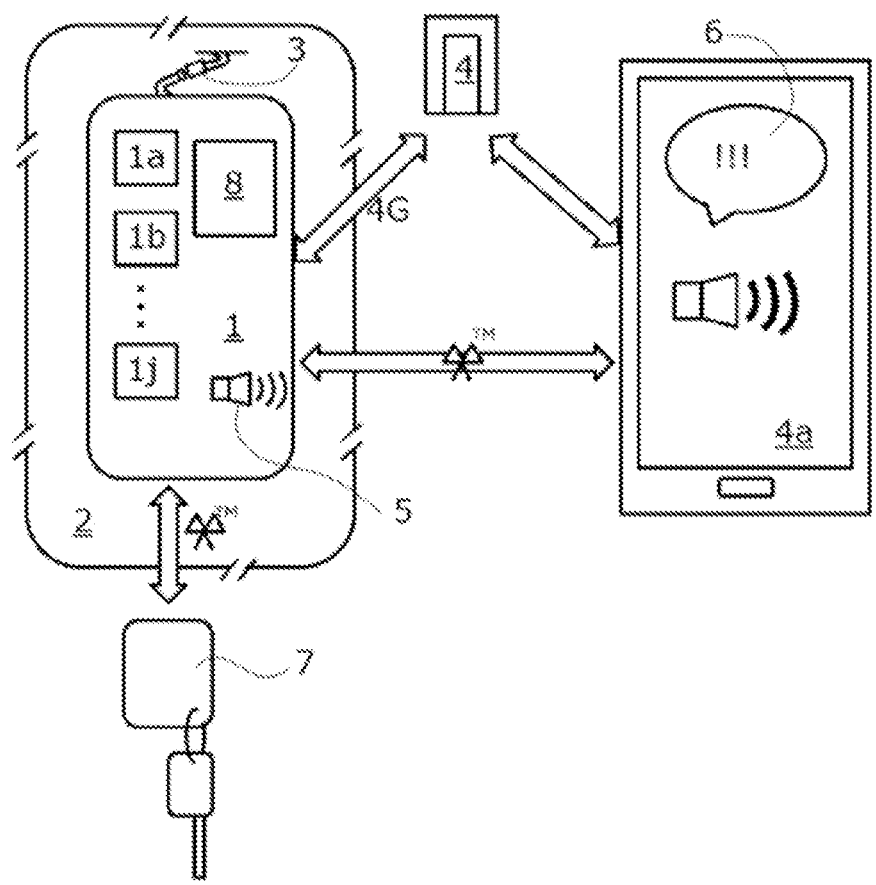

of motorcycles. The invention relates more particularly to monitoring devices for these vehicles.

DEVICE FOR MONITORING A MOTOR VEHICLE, IN PARTICULAR A MOTORCYCLE, KIT AND METHOD BASED ON SAID DEVICE

CROSS-REFERENCE TO RELATED PATENT APPLICATIONS

This application is a U.S. National Stage Application under 35 U.S.C. § 371 of International Patent Application No. PCT/EP2021/058819 filed Apr. 2, 2021, which claims the benefit of priority of French Patent Application No. 2003350 filed Apr. 3, 2020, both of which are incorporated by reference in their entireties. The International Application was published on Oct. 7, 2021, as International Publication No. WO/2021/198522 A1.

TECHNICAL FIELD

The invention relates to the field of motor vehicles, in particular of motorcycles. The invention relates more particularly to monitoring devices for these vehicles.

BACKGROUND

Motor vehicles have become valuable assets that are increasingly subject to theft and robbery. This creates a significant need for a means of surveillance. This risk is even greater for motorcycles, which are also prone to unsteadiness and falling when parked in certain positions.

Thus, monitoring systems have been available, but these have not proved to be fully satisfactory. Indeed some of these systems are complex and time-consuming to mount on the vehicle. In addition, these systems usually have only one means of sending an alert and their alerts are not accessible when the vehicle is out of sight or hearing range.

SUMMARY OF THE INVENTION

An objective of this invention is to provide a simple device that can be mounted on the vehicle, allowing for the implementation of several types of alerts and whose alerts are accessible without a distance limit.

To achieve this objective, the invention proposes a monitoring device for a motor vehicle, in particular a motorcycle, configured to be connected to an interface of the motor vehicle, the device comprising
 a processor combined with a memory,
 a geolocation module,
 preferably a vibration detection module and/or a fall detection module,
 a mobile application module for exchanging vehicle information with a mobile application server,
 an audible alarm and/or a silent alert module for transmitting a silent alert via the mobile application server based on data from the vibration detection module or the fall detection module,
 a mobile internet connection module, and the mobile application module is preferably configured to control the audible alarm remotely.

According to an embodiment of the invention, the monitoring device is a monitoring box.

Advantageously, the monitoring device can be easily connected to an interface and preferably attached to the motor vehicle without requiring a long installation time.

In addition, the monitoring device allows for the inclusion of several types of alerts depending on different types of detection.

According to other aspects considered in isolation, or combined according to all technically feasible combinations:
 the internet connection module is configured for at least one from the 2G, 3G, 4G, NB-IoT and LTE-M networks; and/or
 the monitoring device further comprises a vibration discrimination module configured for vibration shock analysis; and/or
 the vibration discrimination module is configured to detect shock wave vibrations of 150 to 300 milliseconds; and/or
 the monitoring device is configured to be linked to a user's proximity chip, so as to activate the alarm and/or the alert if a third party without a proximity chip uses the motorized vehicle; and/or
 the monitoring device is configured to enter a sleep mode in which it communicates with the application server less frequently and an active mode in which it communicates with the application server more frequently.

The invention further relates to a monitoring device for a motor vehicle comprising a monitoring device according to the invention, and a proximity chip.

Another object of the invention relates to a method of monitoring a motor vehicle, in particular a motorcycle, the method comprises
 a geolocation step for the motorized vehicle,
 preferably a vibration detection step and/or a fall detection step,
 a step to silently alert a user based on vibrations or falls, and/or an audible alert step, and
 preferably a step to control the audible alarm remotely.

In particular, the monitoring process includes a vibration discrimination step to analyze vibration shock waves.

The invention further relates to a motor vehicle comprising a monitoring device according to the invention.

The invention will be further explained by describing non-limiting embodiments, and based on the attached FIGURE illustrating variants of the invention, namely:

BRIEF DESCRIPTION OF THE DRAWINGS

FIG. 1 which is a diagram of a monitoring device according to a preferred embodiment of the invention in its operating environment.

DETAILED DESCRIPTION

The invention relates to a monitoring device 1 for a motor vehicle, in particular for a motorcycle 2. The invention further relates to a motor vehicle 2 comprising such a device 1.

According to this preferred embodiment, the monitoring device 1 is a monitoring box 1. However, the monitoring device 1 can take on a different form. In particular, it may include an audible alarm connected to a box containing all the other components of the monitoring device.

The monitoring box 1 is configured to be connected to an interface 3 of the motor vehicle 2. The interface 3 used is preferably the one for performing diagnostics of the motor vehicle. This type of interface makes it possible to draw information from the vehicle and process it via box 1.

Thus, the box 1 comprises a processor 1a combined with a memory 1b. It is a small processor that can process information from the interface 3 within the scope of the invention, in some cases interacting with the hardware and software elements of the various modules described herein. For the sake of simplicity, the modules are shown in FIG. 1 without any logical connection.

Advantageously, the monitoring box 1 can be easily connected to the interface 3 and is preferably attached to the motor vehicle 2 without requiring a long installation time.

The monitoring box 1 further comprises a geolocation module 1c for locating the position of the box 1, and by extension, the vehicle 2. The geolocation module 1c can interact with the processor 1a to process the location information.

The monitoring box 1 preferably includes a vibration detection module 1d. This module 1d is configured to sense the vibrations experienced by the vehicle 2. It comprises for example a commercially available vibration sensor.

Preferably, the monitoring box 1 further comprises a vibration discrimination module 1e configured to analyze vibration shock waves. This module 1e is combined with the vibration detection module 1d. In particular, it is configured to detect shock wave vibrations from 150 to 300 milliseconds. Advantageously, it makes it possible to limit the detection of innocuous vibrations such as those related to the wind, but still alerts about vibrations related to shocks to the vehicle.

Thus, this module 1e allows for greatly limiting false alarms, by setting the sensitivity of the vibration detection to the application described below. Shocks below 100 or even 135 ms of shock waves, for example, can be ignored.

Alternatively or in combination, the monitoring box 1 preferably comprises a fall detection module 1f. This module 1f is configured to detect falls of the vehicle, in particular of motorcycles 2. It may comprise a fall sensor or a mounting with an accelerometer and/or gyroscope.

The monitoring box 1 further comprises a 1g mobile application module. This 1g module is configured to exchange information about the vehicle 2 with a mobile application server 4. A set of servers can be used. The server(s) 4 may be used for data collection and processing.

A mobile application 4a combined with the application server 4, can be loaded onto a cell phone in particular to receive information about the vehicle 2. A web application can also be used.

In particular, the box 1 communicates by mobile network (e.g. 4G) with the server 4, and the mobile application 4a communicates with the server 4 via the Internet in various ways (e.g. 4G, WIFI . . . ).

According to the invention, the monitoring device 1 comprises an audible alarm 5. Furthermore, the monitoring device 1 comprises a mobile internet connection module 1h. The mobile application module 1g is preferably configured to control the audible alarm 5 remotely via the mobile internet network connection module 1h.

Advantageously, the monitoring box 1 allows for the inclusion of several types of alerts based on different types of detection, and for control of the audible alarm 5 without distance limitation.

Preferably, the housing 1 comprises a thin hole with a grid (not shown) above the audible alarm component 5, which allows the sound to pass through.

The mobile internet connection module 1h may include a SIM card to perform the connection. In particular, the internet connection module 1h is configured for at least one of the following networks: 2G, 3G, 4G, NB-IoT, LTE-M. In addition to not being limited by the distance to control alarm 5. This makes it possible to have an efficient internet connection. Thus, the audible alarm 5 can be triggered by a request remotely from a 4a mobile application, web interface or any other device or accessory.

The control of the alarm 5 by the mobile application 4a can include settings for triggering parameters, sound volumes. In a variant, it is possible to modify the frequency of the alarm signal on the application 4a to find the one that will make the most noise and sound the best on the motorcycle 2. The setting can make the alarm 5 dependent on a detection of the box 1, in particular a detection of a vibration or fall. The control can also be a triggering or stopping of the sound alarm 5 via the application.

Thus, the audible alarm 5 can be triggered automatically at the slightest vibration or fall by a simple setting on the application 4a. If the vehicle 2 falls, the audible alarm 5 is triggered automatically according to the configuration selected. It can be switched off when the vehicle 2 is upright again, or not; or it can be switched off via the application 4a.

Alternatively or in combination, the monitoring box 1 comprises a silent alert module 1i for transmitting a silent alert 6 via the mobile application server 4 based on data from the vibration detection module 1d or the fall detection module 1f. The silent alert module 1i makes it possible to send an alert about a detected event without alerting third parties. It is then possible to discretely check whether the vehicle 2 is in danger.

According to a preferred embodiment, the monitoring box 1 is configured to be combined with a proximity chip 7 of a driver. The box 1 comprises a specific connection module 1j for this purpose, in particular a Bluetooth™ connection module. The proximity chip 7 is intended to be worn by the driver. The monitoring box 1 is configured to activate the alarm 5 and/or the silent alert 6 if a third party without a proximity chip 7 uses the motorized vehicle 2.

In particular, the proximity chip 7 can be put on a key ring. If the chip 7 is within the range of the Bluetooth, then the alarm 5 will not be activated. The system will not alert because it recognizes the driver. The same applies to the silent alert 6.

The Bluetooth connection module 1j can also be used to connect to the mobile application 4a directly for updating purposes.

In one embodiment, the monitoring device 1 is configured to enter a sleep mode in which it communicates with the application server 4 less frequently and an active mode in which it communicates with the application server 4 more frequently. The corresponding time periods can be set by the application 4a. This variant saves energy by not leaving the device 1 permanently connected to the mobile internet. Preferably, a relevant detection, for example of vibration or of a fall, puts the box 1 in active mode so that it notifies the user via the application 4a.

More precisely, in a variant, in active mode, the box 1 communicates every 5 seconds for example with the servers 4 to communicate its position. If no vibration is detected for 3 minutes for example, the box 1 goes into standby mode and sends a presence message only every 15 minutes for example, to be sure that it is working properly.

In this case, it's only in active mode every 5 seconds and in standby mode (adjustable delay) every 15 seconds so that box 1 can receive an audible alarm request 5, because it must wait to receive a message before sending one.

If the box 1 receives a shockwave, i.e. a vibration, in standby mode it switches directly to active mode. In fact, if someone shakes the vehicle before the next presence message (set by default every 15 minutes) the box will wake up and the user will be able to send an audible alarm request earlier than expected.

This presence message system allows for very important energy savings and significantly increases the autonomy of the box 1.

Concerning the power supply of the box 1, a cable (not shown) is connected to the battery of the vehicle 2. Preferably, a high performance battery 8 is also provided in the box 1.

Advantageously, it can continue to emit signals and to trigger the audible alarm 5 or the silent alert 6 even if the box 1 is disconnected from the battery of the vehicle 2, in particular by choice of the user or by pulling it out.

The invention further relates to a monitoring kit for a motor vehicle 2, comprising a monitoring box 1 as described above, and a proximity chip 7 as described above.

Another object of the invention relates to a method of monitoring a motor vehicle, in particular a motorcycle.

The method comprises a geolocalization step of the motor vehicle 2, in which the GPS position of the motor vehicle 2 is recorded and preferably transmitted to a mobile application server 4.

The method further preferably comprises a step for detecting the vibration of the vehicle 2, and/or a step for detecting the fall of the vehicle 2. The vibration and/or fall is preferably transmitted to the application server 4. The vibrations are preferably discriminated as described above.

The method further comprises of step for silently alerting a user based on vibrations or falls, and/or an audible alerting step.

As the case may be, the method may include a step for controlling the audible alarm remotely.

The invention further relates to a motor vehicle 2 comprising a monitoring device 1, for example a box as described above. The production of the vehicle 2 may include a step for installing the device 1, so that the vehicle 2 is sold with the device 1.

The invention claimed is:

1. A monitoring device for a motor vehicle, said monitoring device comprising:
 a processor combined with a memory and
 geolocation means for locating a position of the monitoring device, wherein said monitoring device further comprises:
 vibration detection means for sensing a vibration experienced by the motor vehicle,
 fall detection means for detecting a fall of the motor vehicle,
 mobile application means for exchanging information about the motor vehicle with a mobile application server,
 silent alert means for transmitting a silent alert via the mobile application server based on data from the vibration detection means or from the fall detection means,
 an audible alarm, and
 mobile Internet connection means for performing a connection between the mobile application means and the monitoring device through the mobile application server,
 wherein the mobile application means allows, via the connection performed by the mobile Internet connection means to the mobile application server, the audible alarm to be controlled remotely.

2. The monitoring device according to claim 1, further comprising vibration discrimination means for analyzing vibration shock waves.

3. The monitoring device according to claim 2, wherein the vibration discrimination means detects vibration shock waves from 150 to 300 milliseconds.

4. The monitoring device according to claim 1, wherein the monitoring device is configured to be linked with a proximity chip and to activate the alarm and/or the alert when said proximity chip is not linked.

5. The monitoring device according to claim 1, wherein the monitoring device is configured to operate in a sleep mode in which the monitoring device communicates with the mobile application server less frequently and an active mode in which the monitoring device communicates with the mobile application server more frequently.

6. A monitoring kit for a motor vehicle, comprising the monitoring device according to claim 1, and a proximity chip.

7. A motor vehicle comprising the monitoring device according to claim 1.

* * * * *